United States Patent
Kraselsky

[15] 3,670,934
[45] June 20, 1972

[54] BUDGET CARRIER
[72] Inventor: Maurice A. Kraselsky, 7118 Jones Valley Drive, Huntsville, Ala. 35802
[22] Filed: Aug. 25, 1970
[21] Appl. No.: 66,793

[52] U.S. Cl.................................................224/42.1 E, 220/8
[51] Int. Cl.........................................................B60r 9/04
[58] Field of Search....................224/42 R, 42 D, 42 E, 42 F, 224/42 G; 206/DIG. 11; 220/8, 44 R; 215/56; 190/22, 45

[56] References Cited

UNITED STATES PATENTS

| | | | |
|---|---|---|---|
| 2,920,802 | 1/1960 | Cook | 224/42.1 E |
| 3,228,575 | 1/1966 | Peterson | 224/42.1 E |
| 2,009,721 | 7/1935 | Williams | 224/42.1 E |
| 3,084,825 | 4/1963 | Hultquist | 220/8 |
| 3,356,246 | 12/1967 | Marshall | 220/8 |
| 603,020 | 4/1898 | Bokelmann | 215/56 |

FOREIGN PATENTS OR APPLICATIONS 1,392,322  2/1965  France.............................224/42.1 A Primary Examiner—Philip Arnold

[57] ABSTRACT

A carrier for placement upon the roof of an automobile, the carrier comprising an inexpensive telescopic two part construction made of non-cracking plastic material and comprising a case having molded ribs for providing rigidity thereto, the carrier being provided with adjustable straps each of which is provided with a hook for hooking to the automobile roof gutters.

1 Claim, 2 Drawing Figures

PATENTED JUN 20 1972 3,670,934

INVENTOR
MAURICE A. KRASELSKY

BUDGET CARRIER

This invention relates generally to automobile roof carriers.

It is generally well known that conventional carriers such as are used on automotive vehicles are relatively expensive and many motorists accordingly refrain from purchasing such devices. When they require space for carrying extra freight, they accordingly are obliged to rent a carrier but this likewise can become a costly matter particularly if such carrier is rented often. This situation accordingly is in want of improvement.

Accordingly it is the principal object of the present invention to provide a top carrier for an automotive vehicle and which is made of inexpensive non-cracking plastic material so that it can be inexpensively manufactured and sold at a reasonable price so that every motorist can afford to purchase the same.

Another object of the present invention is to provide a top carrier for an automotive vehicle which is particularly suitable for passenger automobiles, station wagons and the like.

Another object of the present invention is to provide a budget topcarrier for an automotive vehicle and which is believed can be manufactured at approximately one-third to one-half the price of conventionally retailed top carriers.

Other objects of the present invention are to provide a budget carrier which is simple in design, rugged in construction, easy to use and efficient in operation.

These and other objects will be readily evident upon a study of the following specification and the accompanying drawings wherein.

Figure 1:
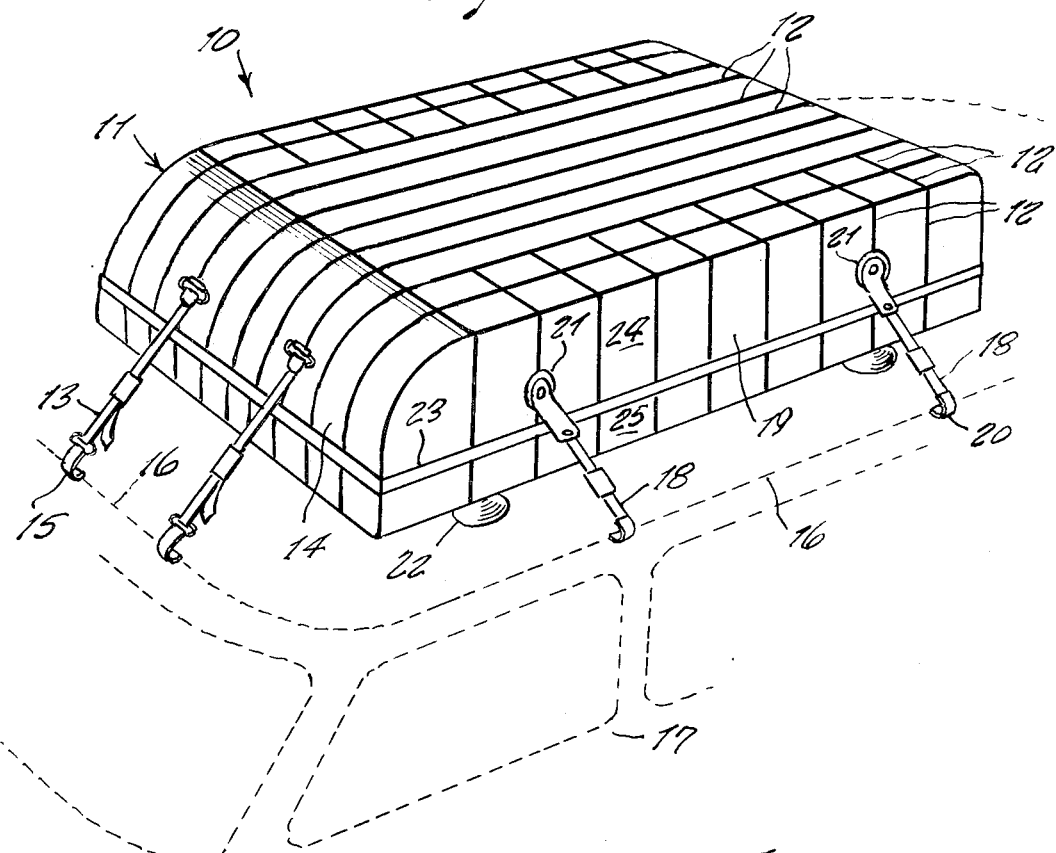
FIG. 1 is a perspective view showing one form of the present invention.

Referring now to the drawing in detail, the reference numeral 10 represents a budget carrier according to the present invention wherein there is a housing or case 11 that is made of inexpensive, non-cracking plastic material and which includes a plurality of parallel ribs 12 formed in the construction thereof which extend longitudinally as well as transversely and vertically.

A pair of forwardly extending adjustable straps 13 are secured to a front side 14 of the carrier, each of the straps being provided with a hook 15 which can be secured to the gutter 16 of the automotive vehicle 17.

Likewise, the carrier is provided with adjustable straps 18 on the opposite side 19 of the carrier, each of the adjustable straps 18 being provided with a hook 20 for engaging the gutter 16.

Latch hooks 21 may be provided, as well as trunk hooks.

On the underside of the carrier there are secured a plurality of vacuum cups 22 for placement against the upper side of the vehicle roof so as to prevent the carrier from marring or scratching the finish of the automobile.

An interlocking overlay groove 23 is provided between an upper and lower half 24 and 25, respectively, of carrier and which will prevent the entry of rain water into the interior of the carrier which would otherwise damage the content placed there within.

It is to be noted that all of the straps are provided with appropriate rings through which the straps are fitted so to form a satisfactory construction.

The hinges between the upper and lower members 24 and 25 of the carrier may be positioned within the interior side of the carrier, these being positioned so that the carrier component can be readily stacked and shipped from a factory in relatively large quantities, thus contributing to maintaining an inexpensive cost to the device for the consumer.

Figure 2:
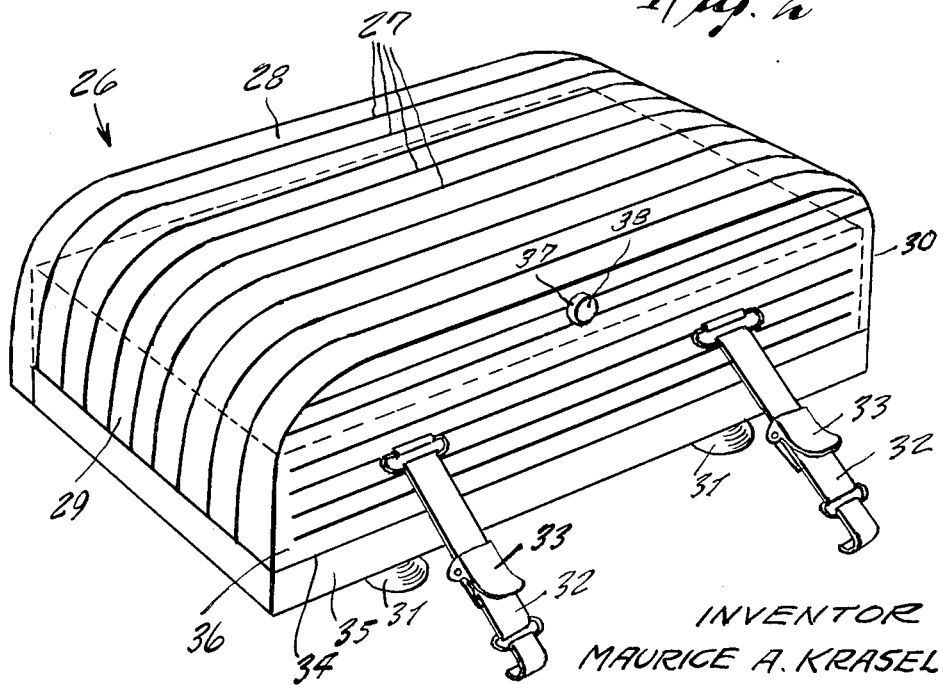
FIG. 2 is a perspective view showing a modified design thereof.

Referring now to FIG. 2 of the drawing, there is shown a modified design of the budget carrier 26 and which is likewise made of inexpensive, non-cracking plastic material, the carrier being provided with the molded ribs 27 which extend in continuation across the top 28, the front side 29 and rear side 30 of the carrier.

Additional ribs 27 are also provided on opposite side of the carrier, as shown. The carrier is likewise mounted upon vacuum cups 31, as above described, and the carrier is also provided with adjustable belt 32 on opposite sides thereof, each of the belts being provided with a pivotable lever tightener, 33 so to take up all slack and thus rigidly secure the carrier upon the automobile roof.

The carrier 26 includes a weather proof seal 34 between a lower member 35 and a removable upper member 36 into which the lower member extends, as indicated by broken lines in FIG. 2 of the drawing. The upper member slides up and down for different height loads and comprises a novel important feature of the present invention so that the motorist can thus carry relatively large objects.

An opening 37 is provided for permiting air to be let out of the interior of the carrier, the opening 37 being normally closable by means of a removable plug 38.

The vacuum cups 31 can have valve means to increase the vacuum when the carrier is in use and air can be pumped into the cups when it is desired to release the vacuum cups from the vehicle roof. An example of cups having means to control vacuum in such cups is found in the Williams U.S. Pat., No. 2,009,721, of record.

Two-way valves are preferable in such construction.

Thus there is provided in the modified form of the construction a budget carrier 26 of soap box lid design which slides upwardly and downwardly so as to accommodate different height loads.

What I now claim is:

1. In a budget carrier, the combination of a case made of inexpensive, non-cracking material, said case being provided with molded ribs so to provide rigidity thereto, said ribs extending around said carrier, and said carrier being provided with a plurality of adjustable straps, said adjustable straps being provided with hooks for engaging a gutter of an automobile roof, and said adjustable straps being adaptable for including lever tighteners for taking up a slack once securing said carrier on said automobile roof, said carrier including a lower member and an upper member, said upper member being detachable from said lower member and fitted thereupon, a weatherproof seal being formed at the junction of said upper and lower members of said case so to prevent rain water entering into said carrier, and the underside of said carrier being provided with a plurality of vacuum cups, said vacuum cups including valve means for controlling movement of air into or outward of said vacuum cups for increasing vacuum or decreasing a vacuum when placed upon an upper side of an automobile roof, said upper member being vertically slideable relative to said lower member so as to accommodate different height of objects placed within said container, said upper and lower members accordingly including slideable relationship side walls for maintaining engagement while said upper member is at different elevations respective to said lower member, an opening being provided in said upper member so to permit air outwardly of said carrier, said opening being normally retained closed by means of a removable plug.

* * * * *